US012509839B2

(12) United States Patent
Carlsen et al.

(10) Patent No.: US 12,509,839 B2
(45) Date of Patent: Dec. 30, 2025

(54) SYSTEM AND METHOD FOR SUCTION ANCHOR DEPLOYMENT WITH SOLID LID

(71) Applicant: Oceaneering International, Inc., Houston, TX (US)

(72) Inventors: Torleif Carlsen, Sandnes (NO); Jon Tore Storesund, Stavanger (NO)

(73) Assignee: Oceaneering International, Inc., Houston, TX (US)

( * ) Notice: Subject to any disclaimer, the term of this patent is extended or adjusted under 35 U.S.C. 154(b) by 166 days.

(21) Appl. No.: 18/379,782

(22) Filed: Oct. 13, 2023

(65) Prior Publication Data

US 2024/0125072 A1 Apr. 18, 2024

Related U.S. Application Data

(60) Provisional application No. 63/415,874, filed on Oct. 13, 2022.

(51) Int. Cl.

| | |
|---|---|
| ***E02D 11/00*** | (2006.01) |
| ***E02D 7/20*** | (2006.01) |
| ***E02D 13/00*** | (2006.01) |
| ***F16L 55/115*** | (2006.01) |

(52) U.S. Cl.

CPC ................ *E02D 11/00* (2013.01); *E02D 7/20* (2013.01); *E02D 13/00* (2013.01); *F16L 55/1157* (2013.01); *E02D 2200/1607* (2013.01); *E02D 2600/20* (2013.01); *E02D 2600/30* (2013.01)

(58) Field of Classification Search

CPC ........... E02D 11/00; E02D 7/20; E02D 13/00; E02D 2200/1607; E02D 2600/20; E02D 2600/30; F16L 55/1157

See application file for complete search history.

(56) References Cited

U.S. PATENT DOCUMENTS 5,195,326 A * 3/1993 Barbe .................... A23B 2/708 62/78
2006/0127187 A1 * 6/2006 Raines .................... B63B 21/27 405/226

FOREIGN PATENT DOCUMENTS

EP 4303367 A1 * 1/2024 ............. E02D 27/52

* cited by examiner

*Primary Examiner* — Kyle Armstrong
(74) *Attorney, Agent, or Firm* — Maze IP Law, P.C.

(57) ABSTRACT

A temporary mechanical and fluidic connection with an anchor wall of a subsea tubular may use a substantially solid, reusable lid for a subsea tubular, which comprises a substantially solid upper surface, a predetermined set of lid anchors (20), a predetermined set of selectively activated valves (30), a seal (40) configured to engage an internal wall (101) of the subsea tubular and create a seal between substantially solid upper surface and the internal wall of the subsea tubular, a connector (50), and a controller (60) by maneuvering the substantially solid, reusable lid proximate an open end (102) of a subsea tubular (100), attaching the substantially solid, reusable lid to the open end of the subsea tubular, using the lid anchors (20) to secure the substantially solid, reusable lid to the open end of the subsea tubular, and operatively engaging the seal (40) to create an occlusive seal between substantially solid upper surface and an internal wall (101) of the subsea tubular.

20 Claims, 4 Drawing Sheets

SYSTEM AND METHOD FOR SUCTION ANCHOR DEPLOYMENT WITH SOLID LID

RELATION TO OTHER APPLICATIONS

This application claims priority through U.S. Provisional Application 63/415,874 filed on Oct. 1, 2022.

BACKGROUND

The technology relates to the field of suction anchor deployment and retrieval, and specifically to deployment and retrieval of suction anchor that does not require using a remotely operated vehicle (ROV).

Suction piles (also called suction caissons or suction anchors and referred to herein as "suction anchors") are a long steel cylinder topped with an anchor top or cap. The cap comprises valves to assist with embedment as well as connections that differ depending on the use of the suction anchor.

Suction anchors are deployed as deep mooring anchors and foundations for subsea infrastructure, applicable for "permanent" and temporary equipment. They may be used as suction anchors on large deep-water projects but are also applicable in shallow waters. Suction anchors are generally deployed from an offshore construction vessel by use of crane or from an anchor handling vessel, with or without an A-frame or other deployment aid systems. The suction anchor is lowered to a seabed and loads resisted through the structure with one or more mooring pad eyes or anchor top footings to the soil via direct bearing and skin friction. Since suction anchors are typically large steel cylinders with an open bottom, the suction anchor penetrates up to 60% of its length under its own weight, depending on soil conditions and the anchor properties. The remainder of embedment is achieved through suction: a remote-operated vehicle (ROV) pumps water out of the top suction port after sealing anchor top valves. Anchor/anchor top and ROV instrumentation contribute to a precise installation. The anchor/anchor can also be retrieved by reversing the installation process, applying an overpressure inside the caisson. Over pressurization is also applicable if boulders are in the anchor/anchor path and/or if the vertical alignment needs adjustment.

The main problems associated with the current method of anchor deployment is the time consumption, manpower consumption and the resources e.g. (ROV) consumption. The traditional suction anchor deployment method lowers one suction anchor at a time to a seabed, then the ROV is maneuvered to the suction anchor for installing the suction anchor by operating the valves and then sealing the suction anchor after installation. So, the complete process is very time consuming, expensive and laborious.

FIGURES

Various figures are included herein which illustrate aspects of embodiments of the disclosed inventions.

DESCRIPTION OF EXEMPLARY EMBODIMENTS

Figure 1:
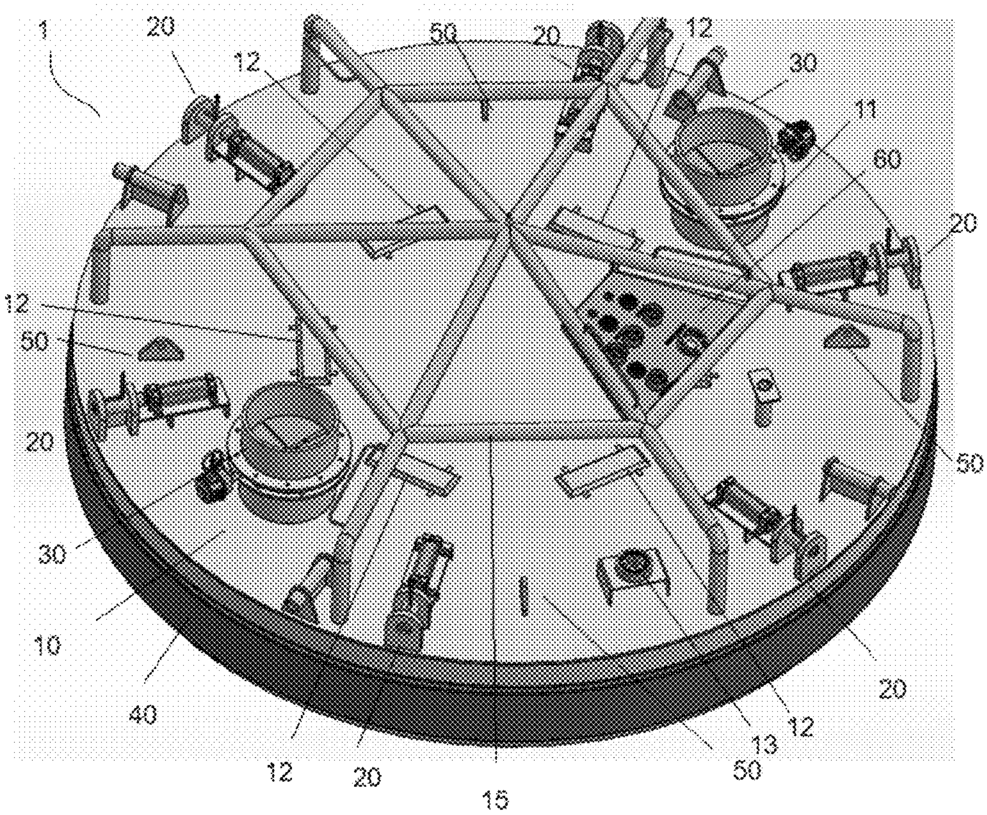
FIG. 1 is a view in partial perspective of an exemplary solid lid anchor top.
Figure 8:
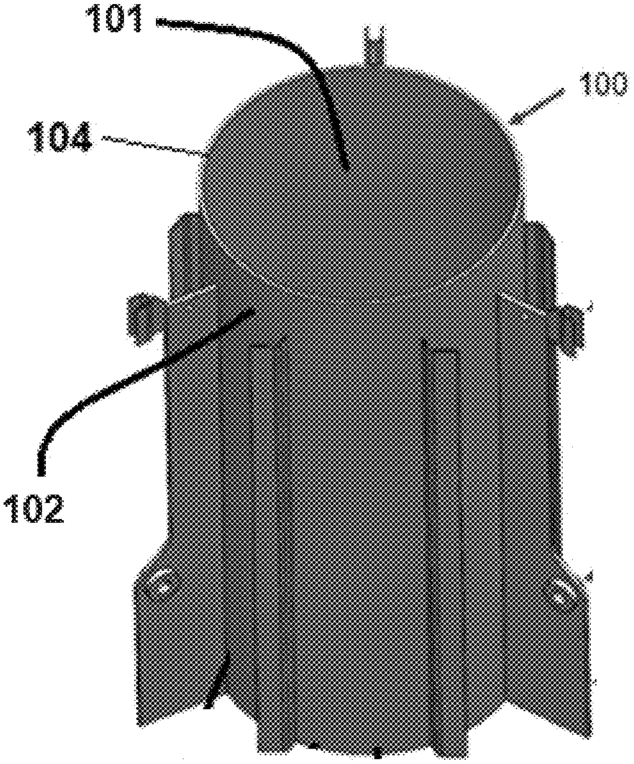
FIG. 8 is a view in partial perspective of a detail of a tubular.

Referring to FIG. 1, substantially solid, reusable lid 1 for a subsea tubular comprises substantially solid upper surface 10 dimensioned to fit over an outer diameter of subsea tubular 100, e.g., into open end 102 (FIG. 8) of subsea tubular 100 (FIG. 8), a predetermined set of lid anchors 20 disposed at least partially about substantially solid upper surface 10, a predetermined set of selectively activated valves 30 disposed through substantially solid upper surface 10, one or more seals 40 disposed about a lower portion of substantially solid upper surface 10 where seals 40 are configured to engage internal wall 101 (FIG. 8) of subsea tubular 100 and create a seal between substantially solid upper surface 10 and internal wall 101 of subsea tubular 100, one or more connectors 50 operatively connected to substantially solid upper surface 10, and one or more controllers 60 operatively connected to the predetermined set of lid anchors 40, the predetermined set of selectively activated valves 30, and, in embodiments, seals 40.

In embodiments, substantially solid, reusable lid 1 comprises a substantially circular shape. Additionally, protection frame 15 may be disposed about substantially solid upper surface 10, which is a surface of substantially solid, reusable lid 1 which is not exposed to an interior of subsea tubular 100, e.g., internal wall 101, to which substantially solid, reusable lid 1 is connected. Protection frame 15 may be of any suitable shape or structure, e.g., a spider-web or other geometric shape.

Figure 2:
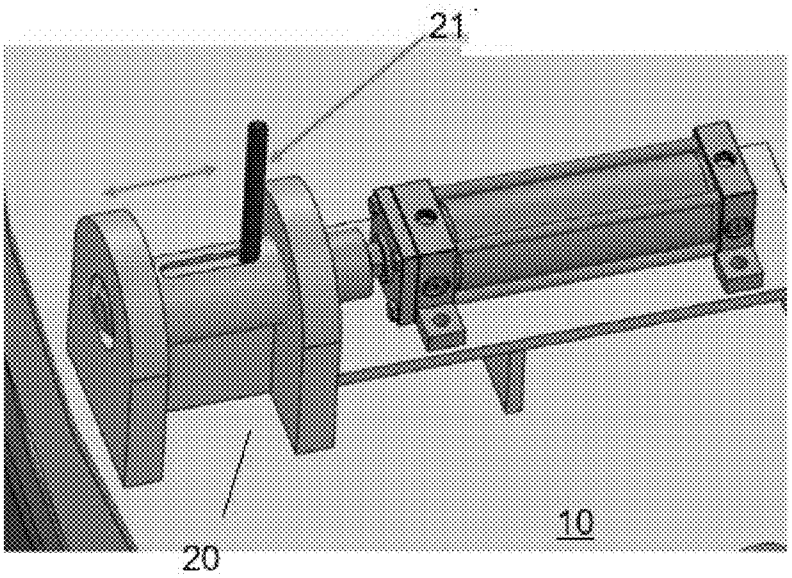
FIG. 2 is a view in partial perspective of a detail of an exemplary solid lid anchor top illustrating an anchor.

Typically, predetermined set of lid anchors 20 are selectively engageable and disengageable. In embodiments, lid anchors 20 comprise a chain, a clamping arm, a pin, a flange, a cam, or a ball grab, or the like, or a combination thereof. At least one lid anchor 20 typically comprises a handle 21 (FIG. 2) operatively connected lid anchor 20.

Figure 3:
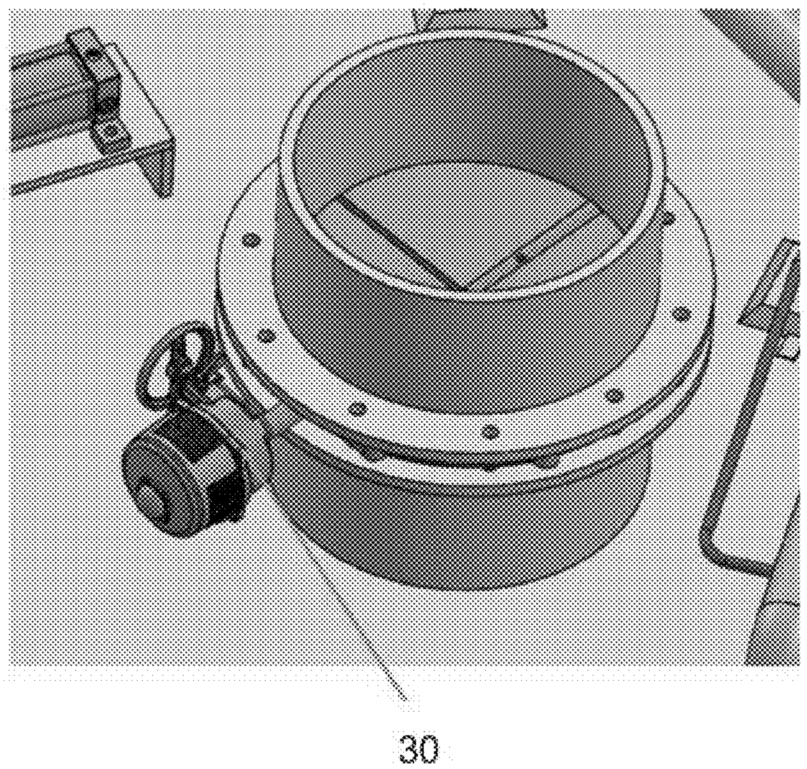
FIG. 3 is a view in partial perspective of a detail of an exemplary solid lid anchor top illustrating a valve.

Referring additionally to FIG. 3, the predetermined set of selectively activated valves 30 may comprise a butterfly valve or a suction hatch or the like. Typically, the predetermined set of selectively activated valves 30 comprise hydraulically operated valves.

Seal 40 may comprise a selectively inflatable seal, a static face seal, or a segmented radial seal, or the like. If it comprises a selectively inflatable seal, seal 40 may further comprise an internal inflatable annular seal or an external inflatable annular sea.

Figure 6:
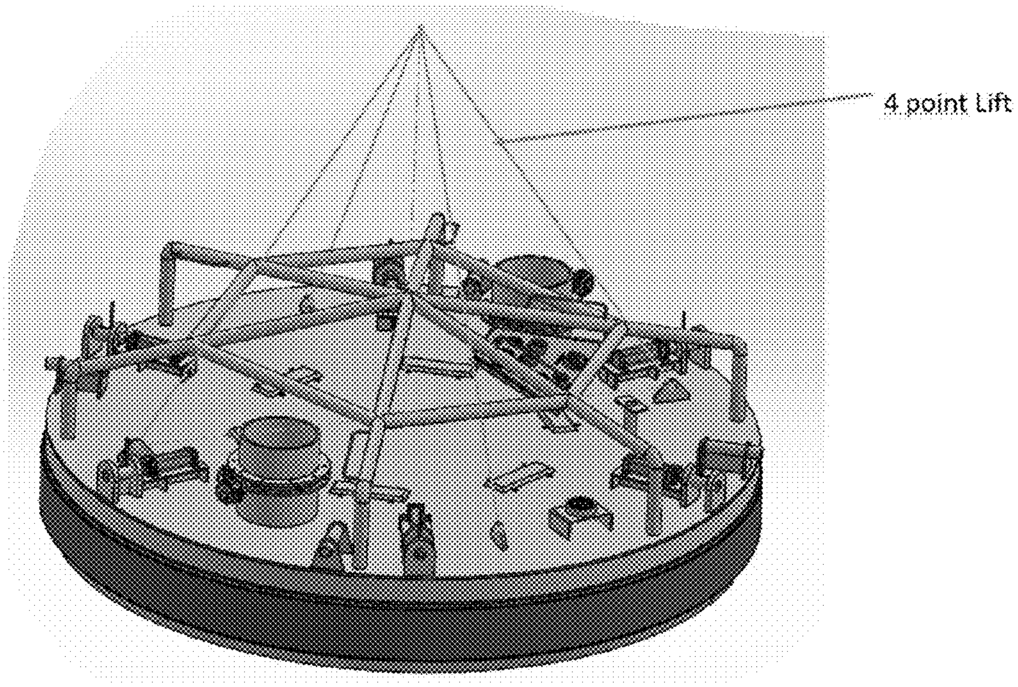
FIG. 6 is a view in partial perspective of a detail of an exemplary solid lid anchor top illustrating a lifting embodiment.
Figure 7:
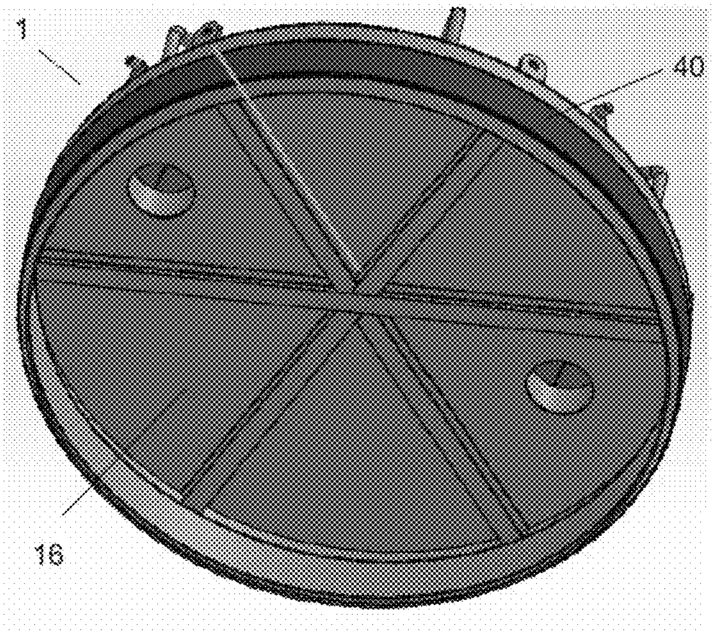
FIG. 7 is a view in partial perspective of a bottom view of an exemplary solid lid anchor top illustrating a valve.

Connector 50 typically comprises a plurality of connectors 50 disposed about an outer perimeter of substantially solid upper surface 10. Connector 50 is typically configured to allow a connection to a lift, e.g., a chain or rope or the like, to allow raising, lowering, and positioning of substantially solid, reusable lid 1 (FIG. 6).

Figure 4:
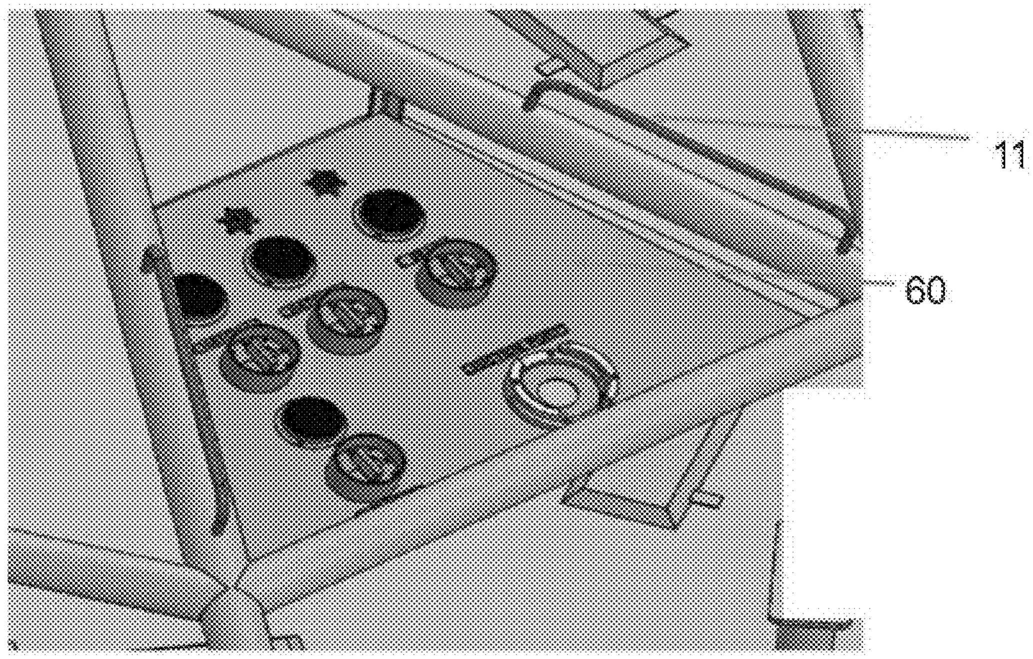
FIG. 4 is a view in partial perspective of a detail of an exemplary solid lid anchor top illustrating a control panel.

Referring additionally to FIG. 4, controller 60 typically comprises a remotely operated vehicle (ROV) compatible control panel. In embodiments, substantially solid, reusable lid 1 further comprises one or more grab bars 11 disposed about substantially solid upper surface 10 proximate the ROV compatible control panel 60.

Figure 5:
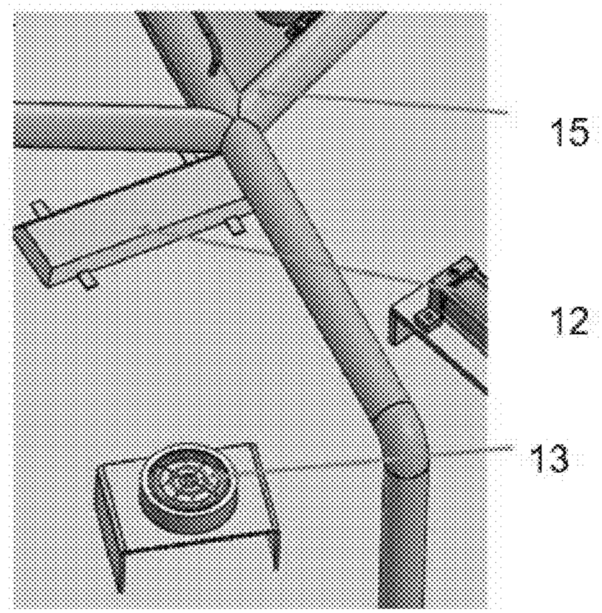
FIG. 5 is a view in partial perspective of a detail of an exemplary solid lid anchor top illustrating a visual indicator and an anode.

Referring additionally to FIG. 5, in embodiments, substantially solid, reusable lid 1 further comprises a predetermined set of anodes 12 operatively connected to substantially solid upper surface 10. These may be disposed at any appropriate surface area, e.g., radially disposed about or proximate a center of substantially solid, reusable lid 1.

In embodiments, substantially solid, reusable lid 1 further comprises one or more visual orientation guides 13 which may be or otherwise comprise a bull's eye.

In the operation of exemplary methods, referring back to FIG. 1, a temporary mechanical and fluidic connection with anchor wall 101 (FIG. 8) of subsea tubular 100 (FIG. 8) may be provided by maneuvering substantially solid, reusable lid 1 proximate open end 102 (FIG. 8) of subsea tubular 100; attaching substantially solid, reusable lid 1 to open end 102 of the subsea tubular 100 by lowering substantially solid, reusable lid 1 to engage it to anchor wall 101; using the predetermined set of lid anchors 20 to secure substantially solid, reusable lid 1 to open end 102 of subsea tubular 100; and operatively engaging seal 40 to create an occlusive seal between substantially solid upper surface 10 and internal wall 101 of subsea tubular 100. The actual method of operatively engaging seal 40 to create the occlusive seal depends on the type of seal being used, e.g., inflating an inflatable seal 40. Creating the occlusive seal with internal wall 101 of subsea tubular 100 typically allows generating negative pressure for seabed embedment or positive pressure for retrieval using seafloor soil as a plug.

Typically, the mechanical temporary connection so created resists forces generated by an internal pressure differential by using ambient pressure. Further, as forces exceed a weight of subsea tubular 100, the mechanical connection may be maintained during a lift operation to allow lifting subsea tubular 100 with substantially solid, reusable lid 1 attached to a surface location or during deployment of subsea tubular 100 from a vessel.

If attaching substantially solid, reusable lid 1 to open end 102 of subsea tubular 100 occurs at a surface location, subsea tubular 100 and its attached substantially solid, reusable lid 1 may be deployed as one unit. If attaching substantially solid, reusable lid 1 to open end 102 of subsea tubular 1 occurs subsea such as with a previously deployed subsea tubular 100 which is embedded into a seabed, embedment of subsea tubular 100 may be finished with the attached substantially solid, reusable lid 1.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A substantially solid, reusable lid for a subsea tubular, comprising:

a) a substantially solid upper surface dimensioned to fit over an outer diameter of the subsea tubular;

b) a predetermined set of lid anchors disposed at least partially about the substantially solid upper surface;

c) a predetermined set of selectively activated valves disposed through the substantially solid upper surface;

d) a seal disposed about a lower portion of substantially solid upper surface, the seal configured to engage an internal wall of the subsea tubular and create a seal between substantially solid upper surface and the internal wall of the subsea tubular;

e) a connector operatively connected to substantially solid upper surface; and f) a controller operatively connected to the predetermined set of lid anchors and the predetermined set of selectively activated valves.

2. The substantially solid, reusable lid of claim 1, wherein the substantially solid, reusable lid comprises:

a) a substantially circular shape; and b) a protection frame disposed about a surface of the substantially solid, reusable lid which is not exposed to an interior of the subsea tubular to which the substantially solid, reusable lid is connected.

3. The substantially solid, reusable lid of claim 1, wherein the predetermined set of lid anchors are selectively engageable and disengageable.

4. The substantially solid, reusable lid of claim 1, wherein the predetermined set of lid anchors comprise a chain, a clamping arm, a pin, a flange, a cam, or a ball grab.

5. The substantially solid, reusable lid of claim 1, wherein at least one lid anchor of the predetermined set of lid anchors comprises a handle operatively connected to the at least one lid anchor.

6. The substantially solid, reusable lid of claim 1, wherein the predetermined set of selectively activated valves comprise a butterfly valve or a suction hatch.

7. The substantially solid, reusable lid of claim 6, wherein the predetermined set of selectively activated valves comprise hydraulically operated valves.

8. The substantially solid, reusable lid of claim 1, wherein the seal comprises a selectively inflatable seal, a static face seal, or a segmented radial seal.

9. The substantially solid, reusable lid of claim 8, where the selectively inflatable seal comprises an internal inflatable annular seal or an external inflatable annular sea.

10. The substantially solid, reusable lid of claim 1, wherein the connector comprises a plurality of connectors disposed about an outer perimeter of substantially solid upper surface.

11. The substantially solid, reusable lid of claim 1, wherein the controller comprises a remotely operated vehicle (ROV) compatible control panel.

12. The substantially solid, reusable lid of claim 11, further comprising a grab bar disposed about substantially solid upper surface proximate the ROV compatible control panel.

13. The substantially solid, reusable lid of claim 1, further comprising a predetermined set of anodes operatively connected to substantially solid upper surface.

14. The substantially solid, reusable lid of claim 1, further comprising a predetermined set of visual orientation guides.

15. The substantially solid, reusable lid of claim 14, wherein at least one visual orientation guide of the predetermined set of visual orientation guides comprises a bull's eye.

16. A method of providing a temporary mechanical and fluidic connection with an anchor wall of a subsea tubular using a substantially solid, reusable lid for a subsea tubular, comprising a substantially solid upper surface dimensioned to fit over an outer diameter of the subsea tubular, a predetermined set of lid anchors disposed at least partially about the substantially solid upper surface, a predetermined set of selectively activated valves disposed through the substantially solid upper surface, a seal disposed about a lower portion of substantially solid upper surface, the seal configured to engage an internal wall of the subsea tubular and create a seal between substantially solid upper surface and the internal wall of the subsea tubular, a connector operatively connected to substantially solid upper surface; and a controller operatively connected to the predetermined set of lid anchors and the predetermined set of selectively activated valves, the method comprising:

a) maneuvering the substantially solid, reusable lid proximate an open end (102) of a subsea tubular;
b) attaching the substantially solid, reusable lid to the open end of the subsea tubular;
c) using the predetermined set of lid anchors to secure the substantially solid, reusable lid to the open end of the subsea tubular; and
d) operatively engaging the seal to create an occlusive seal between substantially solid upper surface and an internal wall of the subsea tubular.

17. The method of claim 16, wherein creating the occlusive seal with the internal wall of the subsea tubular allows generating negative pressure for seabed embedment or positive pressure for retrieval using seafloor soil as a plug.

18. The method of claim 16, wherein the temporary mechanical and fluidic connection resists forces generated by an internal pressure differential by using ambient pressure.

19. The method of claim 16, wherein, as forces exceed a weight of the subsea tubular, the method further comprises maintaining the temporary mechanical and fluidic connection during a lift operation to allow lifting the subsea tubular to a surface location or during deployment of the subsea tubular from a vessel.

20. The method of claim 16, wherein:

a) attaching the substantially solid, reusable lid to the open end of the subsea tubular occurs at a surface location, the method further comprising deploying the subsea tubular and the attached substantially solid, reusable lid to the open end of the subsea tubular as one unit; or
b) attaching the substantially solid, reusable lid to the open end of the subsea tubular occurs subsea with a previously deployed subsea tubular embedded into a seabed, the method further comprising finishing an embedment of the subsea tubular with the attached substantially solid, reusable lid.

* * * * *